Dec. 15, 1936.  O. A. MONEYMAKER  2,064,026
VEHICLE BRAKE
Filed July 16, 1935  3 Sheets-Sheet 1
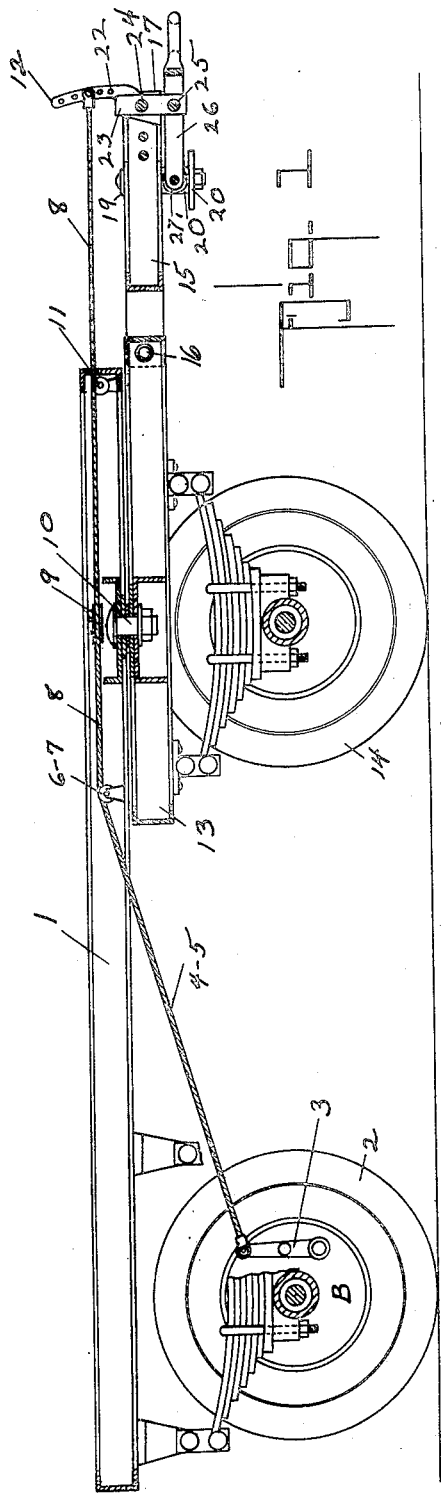
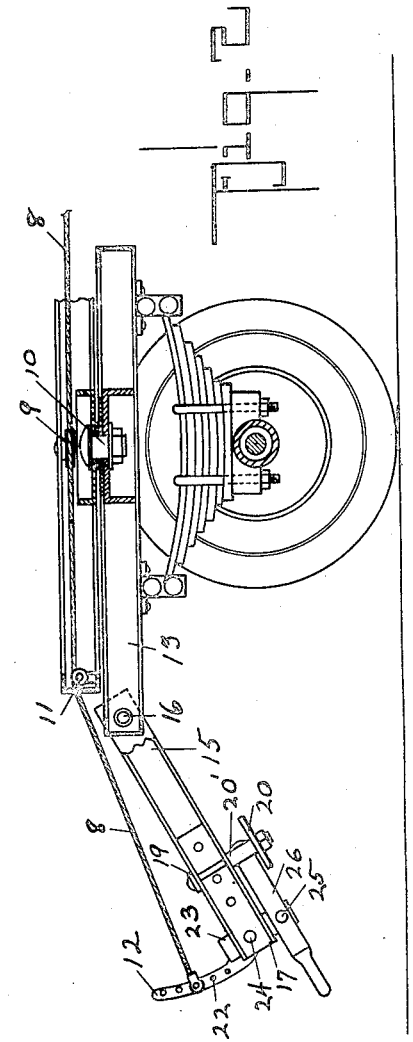
Ora A. Moneymaker
*Inventor*
By Herbert E. Smith
*Attorney*

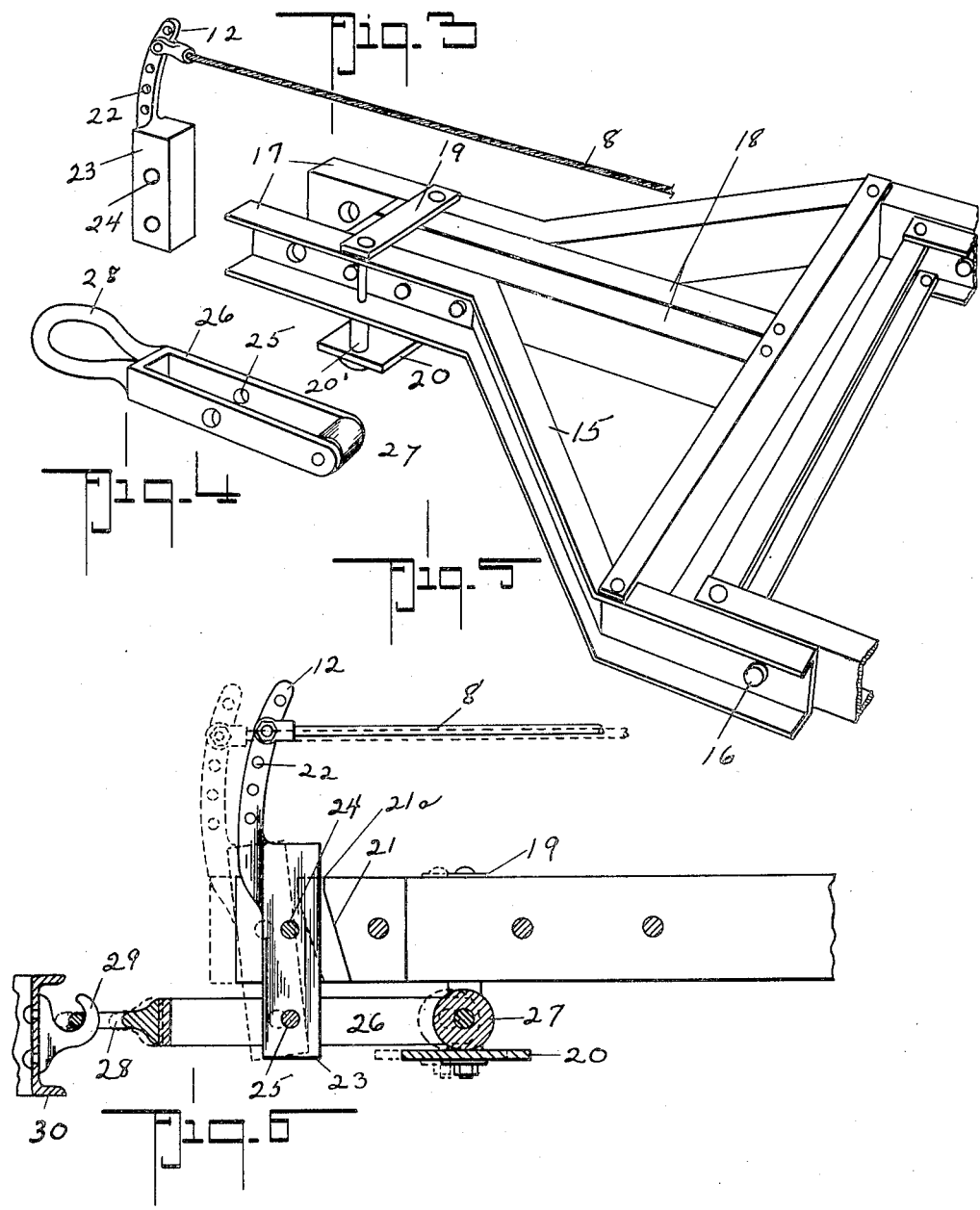

Dec. 15, 1936.  O. A. MONEYMAKER  2,064,026
VEHICLE BRAKE
Filed July 16, 1935  3 Sheets-Sheet 3
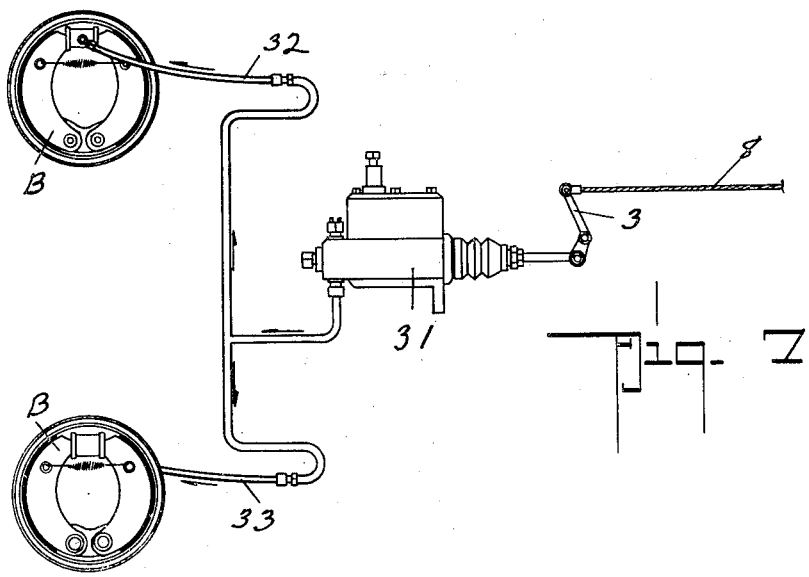
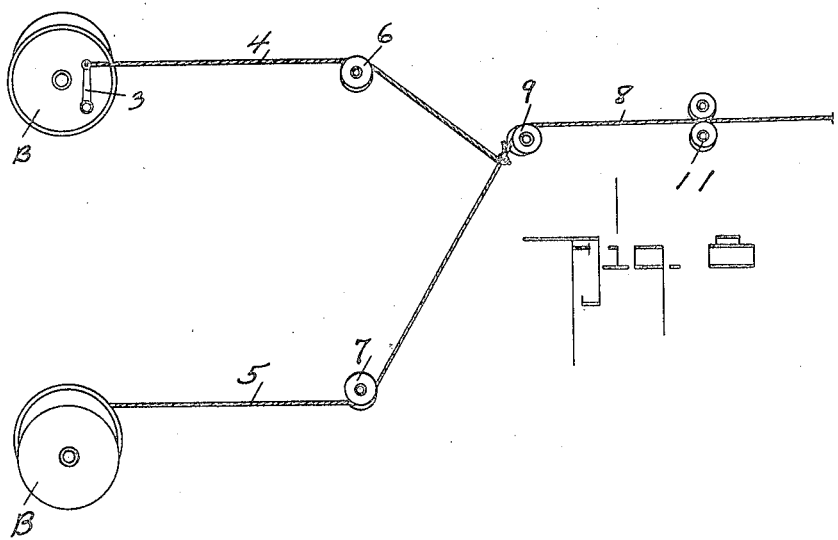

Patented Dec. 15, 1936

2,064,026

UNITED STATES PATENT OFFICE 2,064,026

VEHICLE BRAKE

Ora A. Moneymaker, Uniontown, Wash.

Application July 16, 1935, Serial No. 31,602

3 Claims. (Cl. 188—142)

My present invention relates to improvements in vehicle brakes of the type in which the brakes are applied to the vehicle by means of the momentum of the vehicle, and the application of the brakes is controlled through the draft means between the towing or power appliance, and the towed vehicle, as a trailer. Thus, in carrying out my invention I may utilize a trailer which is equipped with the control mechanism of my invention, and the trailer is towed by an automotive vehicle as a tractor, or a truck, the draft connection between the trailer and the truck or tractor being utilized for controlling the application of the brakes to the trailer by the momentum of the vehicle.

By the utilization of the device of my invention I provide a brake control mechanism for use with brake operating means, either of the fluid pressure operated type or of the mechanically operated type of brake, and the control means of my invention may readily be applied to standard and well known types of trailers and other vehicles.

The automatically operating control means of my invention is simple in construction and operation, and the equipment may readily be installed or applied to trailers and other vehicles now in use at comparatively low cost of manufacture, assembly, and maintenance.

The invention consists in certain novel combinations and arrangements of parts as will hereinafter be more fully set forth and claimed. In the accompanying drawings I have illustrated one complete example of the physical embodiment of my invention in which the parts are combined and arranged according to the best mode I have thus far devised for the practical application of the principles of my invention. While I have shown the control means of my invention adapted for use with well known types of fluid pressure operating brakes and mechanically operated brakes, it will be understood that changes and alterations may be made and are contemplated in the exemplifying structure, and such changes may be made within the scope of my claims without departing from the principles of my invention.

Figure 1 is a longitudinal, vertical sectional view of a four wheel type of trailer for an automotive vehicle, equipped with mechanically operated brakes, and also equipped with the control means of my invention.

Figure 2 is a view similar to Figure 1 but showing only the pony steering truck, of the trailer, and seen from the far side of Figure 1, and showing the control means in operative position to apply the brakes, as a safety device, when the trailer is uncoupled from its tractor or towing truck.

Figures 3, 4, and 5 are separated, detail, perspective views of the operating lever or control lever; the draw-bar or draft-link of the coupling; and the hinged draft-frame of the pony truck or steering truck of the trailer, respectively.

Figure 6 is a detail sectional view at the coupling between the trailer and the towing truck or tractor, showing by full and dotted lines the range of movement of the control parts.

Figure 7 is a diagrammatic view of a fluid pressure operated brake mechanism showing attachment thereto of my control means, and Figure 8 is a diagrammatic view of a mechanically operated brake mechanism under control of my automatically operating control mechanism.

In order that the general arrangement and relation of parts may readily be understood I have shown, in Figure 1, a well known type of four wheel trailer for an automotive vehicle, having the usual body frame 1, and rear wheels 2 equipped with brakes at B. The operating or brake lever 3 of the rear wheels 2 has connected therewith cables 4 and 5 that extend forwardly and around the guide pulleys 6 and 7, and these cables are joined to form the single cable 8 after passing around the guide pulley 9 that is located above the king bolt 10 of the trailer. The single cable 8 then extends toward the front of the trailer between a pair of guide pulleys or rolls 11, and the control cable 8 is attached or connected to the control lever 12. The cables, and the guide pulleys for the cables, are all mounted on the main frame of the trailer, and the main frame of the trailer is swiveled or pivoted on the king bolt 10 on a well known type of pony truck or steering truck 13 having supporting wheels, one of which is indicated as 14.

The frame 13 of the pony truck is provided with a draft-frame 15, which is pivotally connected at 16 with the frame 13, and as indicated in Figure 2, this hinged or pivoted draft-frame, when not coupled with the towing truck or tractor, is free to swing downwardly on its pivot bolts or pins, for safety control of the brakes of the trailer. When coupled with the towing truck or tractor, the draft frame of the trailer is located in substantially, horizontal position as indicated in Figures 1, 5, and 6.

At its front end, the draft frame is fashioned with a pair of closely spaced, parallel arms 17, and between these arms are secured a pair of buffer bars 18, which are longitudinally alined with the trailer and the rear ends of these buffer bars are connected with the cross plate of the frame 15.

The two arms 17, 17 and the brace bars 18, 18 are embraced by a yoke which includes an upper plate 19 and a lower plate 20 that are bolted together, and the bottom plate 20 is spaced slightly below the draft frame with spacing bushings 20' on the bolts.

The forward or front ends of the buffer bars 18, 18 are cut back, or inclined diagonally at 21, as best seen in Figure 6 to form an abutment for the bearing block 23 of the control lever 12. This lever is provided with a series of spaced holes 22 for swivel attachment of the cable 8, and it will be apparent that the leverage may be varied by changing the point of attachment of the cable.

The rectangular bearing block 23 which is integral with or rigid with the control lever 12, fits snugly between the two arms 17 of the draft frame, and is pivotally supported in these arms by means of a pivot bolt 24. The block is located directly in front of the diagonal or inclined abutment 21, and the pivot 24 is located in front of the abutment 21, the latter terminating at its upper end in a bearing point 21a. When the load is being hauled or pulled the block above its pivot contacts with the bearing point 21a and this bearing point limits the backward swing of the control lever 12. When the lever 12 is caused to swing forward, under movement or momentum of the trailer, as the movement of the towing truck or tractor is retarded, this forward swing of the lever is limited by contact with the abutment 21.

The lower end of the block extends below the draft frame and near its lower end, at 25, a pivot bolt of the block connects the block with the draw bar 26, and in this manner the draw bar is pivotally suspended from the bearing block of the control lever.

The draw bar 26, in the form of an open draft-link, at its rear end, is provided with a roller 27 that rests upon the comparatively wide plate 20, and the roller supports the rear end of the draft bar, as the latter moves relatively to the draft frame, as indicated by dotted lines in Figure 6.

The front end of the draft bar is fashioned with a coupling eye 28 that fits over the coupling hook 29 mounted in suitable manner at the rear of the frame 30 (Fig. 6) of the towing truck or tractor.

In Figure 7, where the control cable 8 is connected to the brake lever 3, the latter controls the operation of the motive fluid pressure motor 31, and the latter, through the pipe connections 32 and 33 to the brakes B, B of the wheels of the trailer, supplies the motive power for the operation of the brakes.

From this description taken in connection with my drawings it will be apparent that, with the parts coupled, as in Figure 6 and shown in full lines, the towing truck or tractor will haul or pull the trailer, through the draft connection including the coupling hook 29, the draw bar, bearing block, and the draft-frame of the trailer.

Should the advance or forward movement of the tractor or truck be retarded, and the momentum of the trailer cause the trailer to advance more rapidly than the movement of the tractor, the trailer and draw-bar first advance together, then the draw-bar is stopped and the momentum of the trailer causes a slight, further movement of the control lever due to the fact that the pivot point 25 of the block is now stationary. This forward movement or swing of the control lever is transmitted through the cable to the brake operating levers 31 and the brakes are applied. When the tractor again attains its hauling or pulling speed, the pull on the draw bar again swings the bearing block and control lever to the upright, full line position of Figure 6, the cable is loosened, and the brakes are freed.

In Figure 2, it will be seen that, with the trailer uncoupled from its towing truck or tractor, the draft frame 15 is free to swing down on its pivot 16, and this gravity swing of the draft frame with the draft bar and control block and lever, causes a pull on the cable 8 to swing the brake operating levers and apply the brakes. In this manner the brakes are applied, automatically, should the trailer accidentally become uncoupled from the towing truck or tractor, and the brakes are also applied, automatically, when the draw bar is purposely lifted to disengage the eye from the hook 29. This uncoupling is accomplished by swinging the draft frame with its draw-bar, slightly, on the pivot or hinge 16, to lift the draw bar eye from the hook.

Having thus fully described my invention, what I claim as new and desire to secure by Letters Patent is:—

1. In a brake control mechanism of the momentum type, the combination with a towing vehicle and its coupling member, of a trailer-frame, a control member pivoted in the trailer frame and projecting above and below said frame, means on the frame co-acting with said member to limit its pivotal movement, a flexible brake-cable connected with said member above its pivotal point, a longitudinally movable draft bar pivoted to said member below the frame, a rigid support on the frame, and said draft bar having at its rear end a movable bearing on said support.

2. In a brake control mechanism, the combination with a vehicle-frame and its hinged draft-frame, of a bearing block pivoted in the free end of the draft frame and means for limiting the pivotal movement of the block, a control lever rigid with and projecting above the block and a control cable connected with the lever, a draw-bar pivotally suspended at an intermediate point from said block below the draft-frame, a support rigid with and beneath the draft frame, and the rear end of said draft bar having a movable bearing on said support.

3. In a brake control mechanism, the combination with a vehicle-frame and its hinged draft frame, of a control member pivoted at the free end of the draft frame, said draft frame having a bearing point for contact with the member and a diagonally extending abutment for alternate contact with the member, a longitudinally movable draw bar pivotally suspended from said member below the draft frame, means on the draft-frame affording a bearing support for the rear end of the draw bar, a flexible brake cable supported on the vehicle frame, and said cable having a connection to the control member above its pivotal support.

ORA A. MONEYMAKER.